United States Patent
Baba et al.

(10) Patent No.: US 10,841,521 B2
(45) Date of Patent: Nov. 17, 2020

(54) INFORMATION PROCESSING DEVICE, INFORMATION PROCESSING METHOD, AND PROGRAM

(71) Applicant: SONY CORPORATION, Tokyo (JP)

(72) Inventors: Koichi Baba, Kanagawa (JP); Taiichiro Watanabe, Kanagawa (JP); Hirokazu Ejiri, Kanagawa (JP)

(73) Assignee: Sony Corporation, Tokyo (JP)

( * ) Notice: Subject to any disclaimer, the term of this patent is extended or adjusted under 35 U.S.C. 154(b) by 305 days.

(21) Appl. No.: 16/061,466

(22) PCT Filed: Dec. 8, 2016

(86) PCT No.: PCT/JP2016/086480
§ 371 (c)(1),
(2) Date: Jun. 12, 2018

(87) PCT Pub. No.: WO2017/110483
PCT Pub. Date: Jun. 29, 2017

(65) Prior Publication Data
US 2020/0267341 A1    Aug. 20, 2020

(30) Foreign Application Priority Data

Dec. 22, 2015  (JP) .................. 2015-249348

(51) Int. Cl.
*H04N 5/378* (2011.01)
*G11C 13/00* (2006.01)
*H04L 9/32* (2006.01)

(52) U.S. Cl.
CPC .......... *H04N 5/378* (2013.01); *G11C 13/004* (2013.01); *H04L 9/3278* (2013.01);
(Continued)

(58) Field of Classification Search
CPC ........ H04N 5/374; H04N 5/378; H04N 5/225; H04N 5/335; H04N 5/357; H04N 5/347;
(Continued)

(56) References Cited

U.S. PATENT DOCUMENTS 9,488,592 B1 * 11/2016 Maresca ................. G06T 5/002
2010/0092104 A1 * 4/2010 Klijn ...................... H04N 5/202
382/275
(Continued)

FOREIGN PATENT DOCUMENTS

JP    2005-523481    8/2005
JP    2016-105585    9/2016

OTHER PUBLICATIONS

International Search Report prepared by the Japan Patent Office dated Jan. 31, 2017, for International Application No. PCT/JP2016/086480.
(Continued)

*Primary Examiner* — Amy R Hsu
(74) *Attorney, Agent, or Firm* — Sheridan Ross P.C.

(57) ABSTRACT

The present disclosure relates to an information processing device, an information processing method, and a program that enable generation of stable PUFs. The information processing device includes: a reading unit that reads output data from a predetermined element a plurality of times; an average value calculation unit that calculates average values of the output data read by the reading unit; a median calculation unit that calculates the median of the average values calculated by the average value calculation unit; and a PUF generation unit that generates a physical unclonable function (PUF) by comparing the median with the average values. The predetermined element is an image sensor, and the reading unit reads output data from the image sensor
(Continued)

when the image sensor is shielded from light. The present technology can be applied to imaging devices, for example.

20 Claims, 14 Drawing Sheets

(52) U.S. Cl.
CPC ........ *G11C 13/003* (2013.01); *G11C 13/0026* (2013.01); *G11C 13/0028* (2013.01)

(58) Field of Classification Search
CPC ........ H04N 5/361; H04N 5/367; H04N 5/363; H04N 5/365; H04N 5/36963; H04N 5/3745; H04N 5/376; H04N 5/379
See application file for complete search history.

(56) References Cited

U.S. PATENT DOCUMENTS

| | | |
|---|---|---|
| 2013/0234471 A1 | 9/2013 | Fujita |
| 2015/0055417 A1 | 2/2015 | Kim et al. |
| 2015/0113243 A1* | 4/2015 | Dupaquis ............. H04L 9/3247 711/164 |
| 2015/0169247 A1* | 6/2015 | Wang ..................... G06F 7/582 711/103 |
| 2015/0195088 A1* | 7/2015 | Rostami ............... H04L 9/3278 380/28 |
| 2015/0234471 A1 | 8/2015 | Niinuma |
| 2018/0159683 A1* | 6/2018 | Lawrenson ............. H04L 9/14 |
| 2019/0123916 A1* | 4/2019 | Facon .................. H04L 9/0662 |

OTHER PUBLICATIONS

"PUF—Physical Unclonable Functions: Protecting Next-Generation Smart Card ICs with SRAM-based PUFs," NXP Semiconductors N.V., Feb. 2013, 8 pages.

Chen et al., "Further Investigations on Traps Stabilities in Random Telegraph Signal Noise and the Application to a Novel Concept Physical Unclonable Function (PUF) with Robust Reliabilities," Symposium on VLSI Technology Digest of Technical Papers, 2015, 2 pages.

* cited by examiner

INFORMATION PROCESSING DEVICE, INFORMATION PROCESSING METHOD, AND PROGRAM

CROSS REFERENCE TO RELATED APPLICATIONS

This application is a national stage application under 35 U.S.C. 371 and claims the benefit of PCT Application No. PCT/JP2016/086480 having an international filing date of 8 Dec. 2016, which designated the United States, which PCT application claimed the benefit of Japanese Patent Application No. 2015-249348 filed 22 Dec. 2015, the entire disclosures of each of which are incorporated herein by reference.

TECHNICAL FIELD

The present disclosure relates to an information processing device, an information processing method, and a program, and more particularly, to an information processing device, an information processing method, and a program that are capable of generating stable physical unclonable functions (PUFs) that are less susceptible to environmental changes and have little degradation in characteristics.

BACKGROUND ART

These days, PUFs are used in IC tags, authentication security systems, prevention of LSI counterfeit, and the like. Examples of such PUFs include Smart Cards using SRAMs (Non-Patent Document 1) and arbiter PUFs. Further, a PUF technology using random telegraph noise (RTN) has been reported as a PUF technology yet to be commercialized (Non-Patent Document 2).

CITATION LIST

Non-Patent Documents

Non-Patent Document 1: <Protecting next-generation Smart Card ICs with SRAM-based PUFs, Document order number: 9397 750 17366, www.nxp.com, February 2013>

Non-Patent Document 2: <Jiezhi Chen, Tetsufumi Tanamoto, Hiroki Noguchi and Yuichiro Mitani, "Further Investigations on Traps Stabilities in Random Telegraph Signal Noise and the Application to a Novel Concept Physical Uncionable Function (PUF) with Robust Reliabilities", Toshiba Corporation, VLSI Technology (VLSI Technology), 2015 Symposium on, T40-T41, 16-18 Jun. 2015>

SUMMARY OF THE INVENTION

Problems to be Solved by the Invention

Suggested PUF techniques include a technique using a bit pattern immediately after turning on the power to an SRAM cell, a technique using a difference in signal delay time due to variation in transistor threshold voltage, and the like. In the case of a technique utilizing SRAM delays, however, variation in transistor threshold is used, and therefore, there is a possibility that the set ID gradually changes due to factors such as temporal deterioration of the oxide film quality due to electrical stress.

Also, in the case of the PUF technique using RTN, there is a possibility that the RTN characteristics randomly change at high temperature. Furthermore, the signal is weak, and there is a need to prepare a special circuit for reading a very small current.

The present disclosure has been made in view of such circumstances, and is capable of generating stable physical unclonable functions (PUFs) that are less susceptible to environmental changes and have little degradation in characteristics.

Solutions to Problems

An information processing device according to one aspect of the present technology includes: a reading unit that reads output data from a predetermined element a plurality of times; an average value calculation unit that calculates an average value of the output data read by the reading unit; a median calculation unit that calculates a median of the average value calculated by the average value calculation unit; and a PUF generation unit that generates a physical unclonable function (PUF) by comparing the median with the average value.

An information processing method according to one aspect of the present technology includes the steps of: reading output data from a predetermined element a plurality of times; calculating an average value of the read output data; calculating a median of the calculated average value; and generating a physical unclonable function (PUF) by comparing the median with the average value.

A program according to one aspect of the present technology is a program for causing a computer to perform a process including the steps of: reading output data from a predetermined element a plurality of times; calculating an average value of the read output data; calculating a median of the calculated average value; and generating a physical unclonable function (PUF) by comparing the median with the average value.

In the information processing device, the information processing method, and the program according to one aspect of the present technology, output data from a predetermined element is read a plurality of times, the average value of the read output data is calculated, and the median of calculated average values is calculated, and the median is compared with the average values. In this manner, a PUF is generated.

Effects of the Invention

According to one aspect of the present technology, it is possible to generate stable PUFs that are less susceptible to environmental changes and have little degradation in characteristics.

It should be noted that effects of the present technology are not limited to the effects described above, and may include any of the effects described in the present disclosure.

MODES FOR CARRYING OUT THE INVENTION

The following is a description of modes (hereinafter referred to as embodiments) for carrying out the present technology.

The present technology described below can be applied, for example, in a case where a physical unclonable function (PUF) is generated, and the generated PUF is used in a security technology or the like. PUF is a technology for identifying IC chips by converting individual differences caused by a crystal pattern of silicon or the like during the IC chip manufacturing process to digital information as a PUF, for example.

A PUF has such a feature that its occurrence pattern is difficult to predict and is permanently maintained. Therefore, even if an unauthorized copy of the semiconductor circuit pattern is made, it is difficult to duplicate the PUF. Taking advantage of such features, the PUF technology can be utilized as a security technology such as low-cost but advanced authentication determination or counterfeit prevention, without using any special cryptographic technology.

In the description below, an example case where a PUF is generated with an image sensor (an imaging element) will be described. Further, the present technology can be applied to memories other than image sensors, for example, and a case where the present technology is applied to a memory or the like will also be described later.

<Configuration of an Information Processing System>

Figure 1:
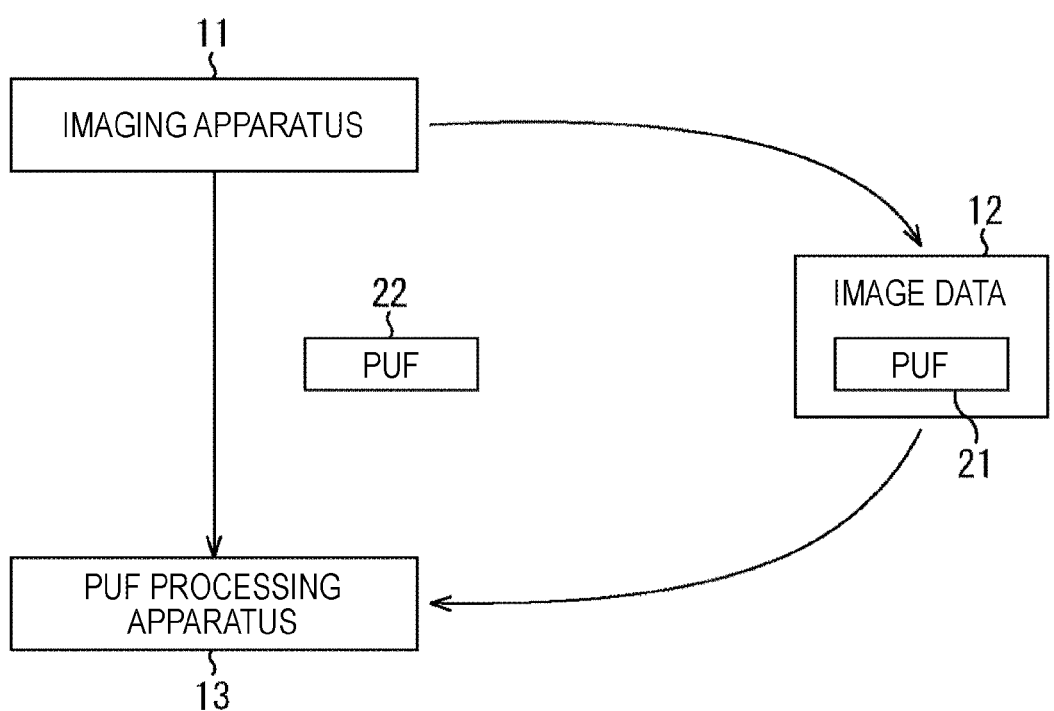
FIG. 1 is a diagram showing the configuration of an embodiment of an information processing system to which the present technology is applied.

FIG. 1 is a diagram showing the configuration of an embodiment of an information processing system to which the present technology is applied. The information processing system shown in FIG. 1 includes an imaging device 11 and a PUF processing device 13. The imaging device 11 is a device such as a digital still camera that captures images, and includes an image sensor. The imaging device 11 captures an image, and generates image data 12.

The imaging device 11 captures the image at a predetermined time, such as the time at which the power supply to the imaging device 11 is turned on or the time at which an image is captured, and generates a PUF 21 to be included in the image data 12 at the time at which the image data 12 is stored into a predetermined storage unit or the like. In a case where the PUF 21 is incorporated into the image data 12, the PUF 21 can be included together with imaging information such as the date and time of the imaging, exposure information, or the like.

The PUF processing device 13 compares a PUF 22 obtained from the imaging device 11 with the PUF 21 included in the image data 12, to determine whether the image data 12 is an image captured by the imaging device 11. When the PUF processing device 13 makes the determination, the PUF processing device 13 instructs the imaging device 11 to generate a PUF, and as a result, the PUF processing device 13 acquires the PUF 22 generated on the side of the imaging device 11.

The usage example of PUFs shown herein is merely an example. The PUF processing device 13 can be designed to perform processing using a PUF, other than the comparison between PUFs.

Further, communication between the imaging device 11 and the PUF processing device 13 can be performed through Near Field Communication (NEC). NEC is an international standard near field communication technology specified by ISO, and is compatible with Type A, Type B, FeliCa (registered trademark), and communication methods compliant with ISO 15693, and is a communication method by which a noncontact IC card function, a reader/writer function, an inter-terminal communication function, and the like can be used.

<Configuration of the Imaging Device>

Figure 2:
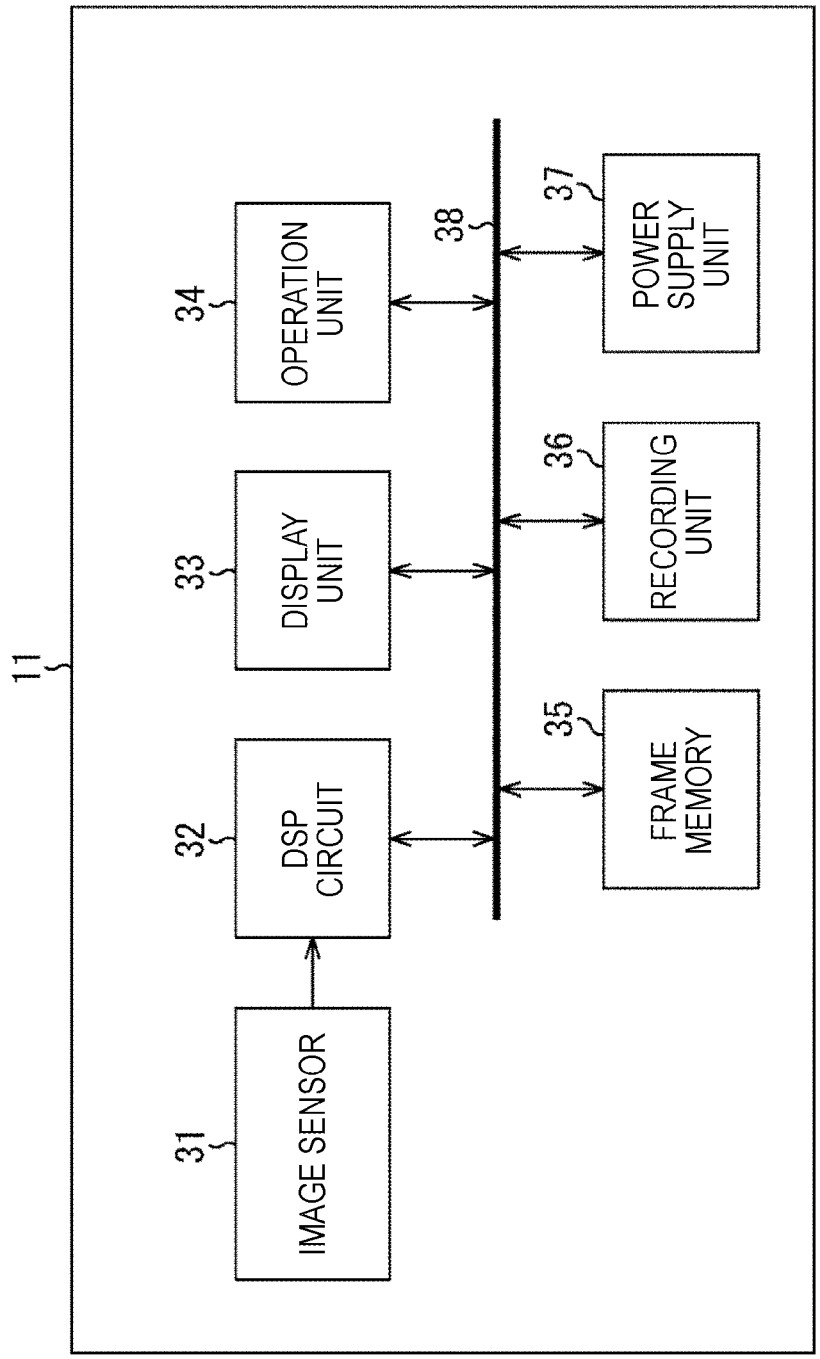
FIG. 2 is a diagram showing the configuration of an imaging device.

FIG. 2 is a diagram showing an example configuration of the imaging device 11. The imaging device 11 shown in FIG. 2 is, for example, an electronic apparatus, such as an imaging device like a digital still camera or a video camera, or a mobile terminal device like a smartphone or a tablet.

In FIG. 2, the imaging device 11 includes an image sensor 31, a DSP circuit 32, a display unit 33, an operation unit 34, a frame memory 35, a recording unit 36, and a power supply unit 37. Also, in the imaging device 11, the DSP circuit 32, the display unit 33, the operation unit 34, the frame memory 35, the recording unit 36, and the power supply unit 37 are connected to one another via a bus line 38.

The image sensor 31 has the configuration described later with reference to FIG. 3. The image sensor 31 captures incident light (image light) from the object via an optical lens system (not shown), converts the amount of the incident light gathered on the imaging surface into an electrical signal on a pixel-by-pixel basis, and outputs the electrical signal as a pixel signal.

The DSP circuit 32 is a signal processing circuit that processes the signal supplied from the image sensor 31. The DSP circuit 32 outputs image data obtained by processing the signal from the image sensor 31. The frame memory 35 temporarily stores, on a frame-by-frame basis, the image data processed by the DSP circuit 32.

The display unit 33 is formed with a panel display device such as a liquid crystal panel, an organic electro-luminescence (EL) panel, or the like, and displays a moving image or a still image formed by the image sensor 31. The recording unit 36 records the image data of the moving image or the still image formed by the image sensor 31 into a recording medium such as a semiconductor memory or a hard disk.

The operation unit 34 outputs operation instructions as to the various functions of the imaging device 11, in accordance with an operation performed by the user. The power supply unit 37 supplies the DSP circuit 32, the frame memory 35, the display unit 33, the recording unit 36, and the operation unit 34 with various power sources as the operation power sources for these supply destinations, as appropriate.

<Configuration of the Image Sensor>

Figure 3:
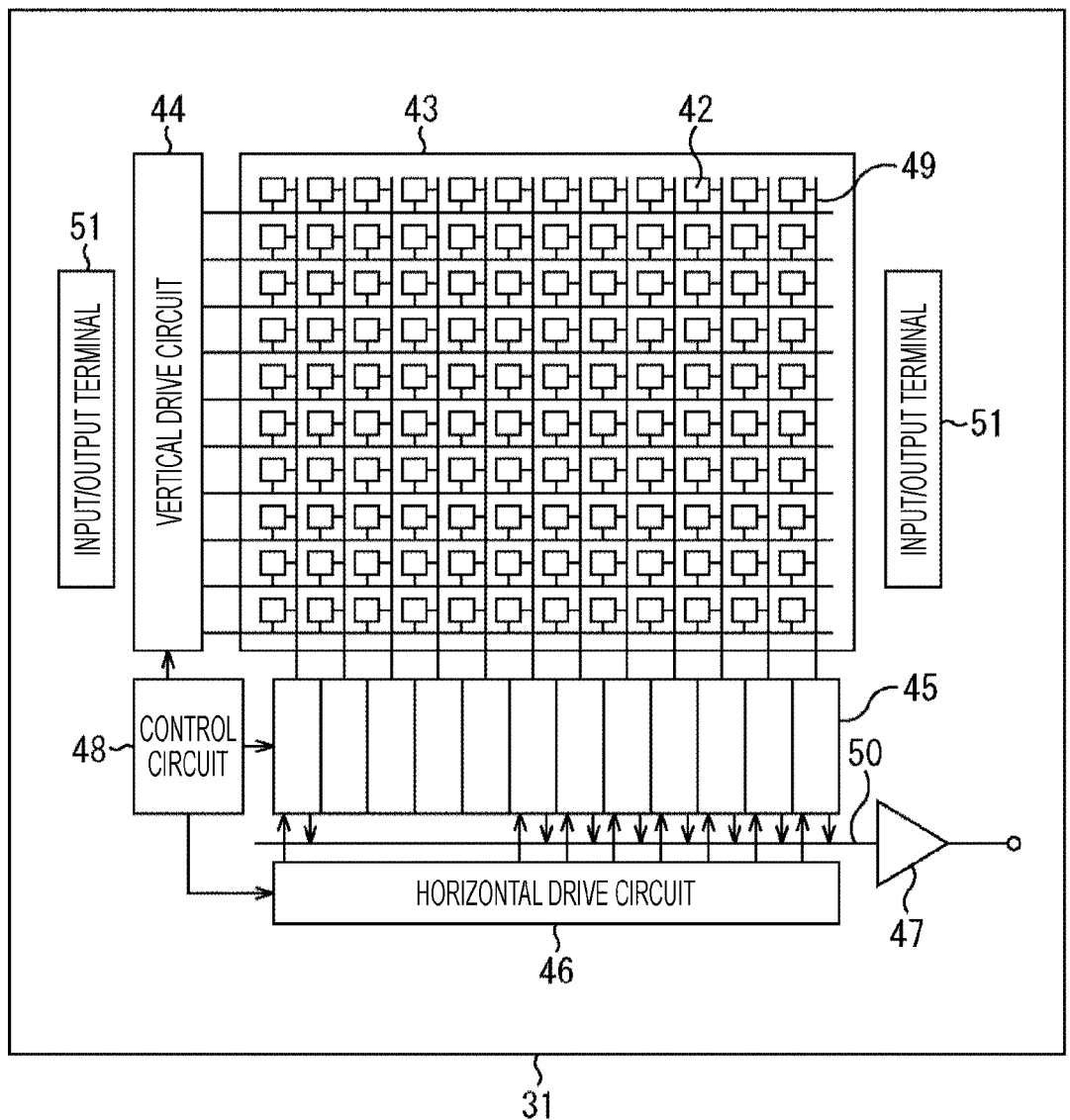
FIG. 3 is a diagram showing the configuration of an image sensor.

FIG. 3 shows an example configuration of the image sensor 31. The image sensor 31 shown in FIG. 3 is a CMOS image sensor. As shown in FIG. 3, the image sensor 31 of this example includes a pixel unit 43 in which a plurality of pixels 42 including photoelectric converters is regularly and two-dimensionally arranged on a semiconductor substrate such as a silicon substrate, and a peripheral circuit unit. The pixels 42 each include a photoelectric converter and a plurality of pixel transistors (so-called MOS transistors).

The plurality of pixel transistors may be formed with the three transistors: a transfer transistor, a reset transistor, and an amplification transistor, for example. Alternatively, the plurality of pixel transistors may be formed with the four transistors: a select transistor and the above three transistors. Since the equivalent circuit of a unit pixel is similar to a conventional one, detailed explanation thereof is not made herein. Alternatively, the pixels may have a shared pixel structure in which a plurality of photoelectric converters shares the pixel transistors other than the transfer transistors, and also share a floating diffusion.

The peripheral circuit unit includes a vertical drive circuit 44, column signal processing circuits 45, a horizontal drive circuit 46, an output circuit 47, a control circuit 48, and the like.

The control circuit 48 receives an input clock and data that designates an operation mode and the like, and also outputs data such as internal information about the imaging device 11. That is, in accordance with a vertical synchronization signal, a horizontal synchronization signal, and a master clock, the control circuit 48 generates a clock signal and a control signal that serve as the references for operation of the vertical drive circuit 44, the column signal processing circuits 45, the horizontal drive circuit 46, and the like. The control circuit 48 then inputs these signals to the vertical drive circuit 44, the column signal processing circuits 45, the horizontal drive circuit 46, and the like.

The vertical drive circuit 44 is formed with a shift register, for example. The vertical drive circuit 44 selects a pixel drive line, supplies a pulse for driving pixels to the selected pixel drive line, and drives the pixels on a row-by-row basis. That is, the vertical drive circuit 44 sequentially selects and scans the respective pixels 42 of the pixel unit 43 on a row-by-row basis in the vertical direction, and supplies pixel signals based on signal charges generated in accordance with the amounts of light received at photodiodes that are the photoelectric conversion elements of the respective pixels 42, for example, to the column signal processing circuits 45 through vertical signal lines 49.

The column signal processing circuits 45 are provided for the respective columns of the pixels 42, and perform signal processing, such as denoising on a column-by-column basis, for example, on signals that are output from the pixels 42 of one row. Specifically, the column signal processing circuits 45 perform signal processing, such as CDS, signal amplification, and AD conversion, to remove fixed pattern noise unique to the pixels 42. Horizontal select switches (not shown) are provided between and connected to the output stages of the column signal processing circuits 45 and a horizontal signal line 50.

The horizontal drive circuit 46 is formed with a shift register, for example. The horizontal drive circuit 46 sequentially selects the respective column signal processing circuits 45 by sequentially outputting horizontal scan pulses, and causes the respective column signal processing circuits 45 to output pixel signals to the horizontal signal line 50.

The output circuit 47 performs signal processing on signals sequentially supplied from the respective column signal processing circuits 45 through the horizontal signal line 50, and outputs the processed signals. For example, the output circuit 47 might perform only buffering, or might perform black level control, column variation correction, various kinds of digital signal processing, and the like. Input/output terminals 51 exchange signals with the outside.

<Structure of the Pixels>

Figure 4:
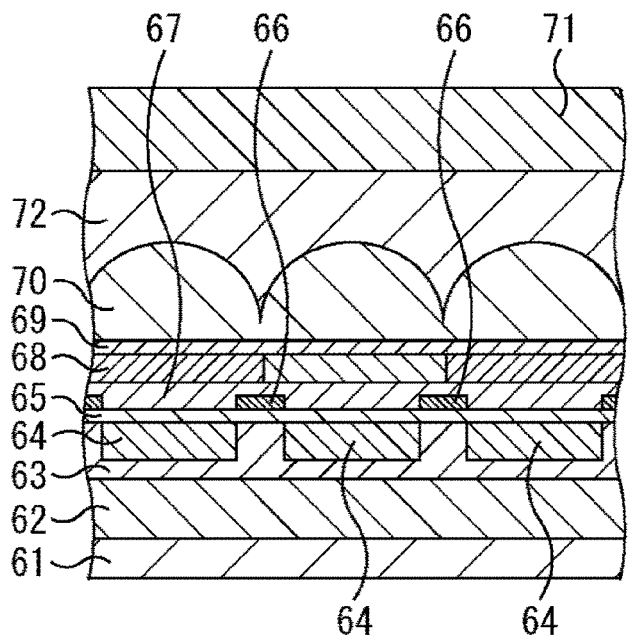
FIG. 4 is a cross-sectional view of a pixel.

FIG. 4 is a cross-sectional view schematically showing the structure of each pixel 42 shown in FIG. 2. The pixel 42 shown in FIG. 4 forms a back-illuminated CMOS image sensor.

The configuration that is shown in FIG. 4 and is described below is merely an example, and the present technology described below can be applied to other configurations. For example, the present technology can also be applied to a configuration that includes not only the respective layers described below but also some other layers, or a configuration that excludes one of the layers described below.

In addition, although a back-illuminated CMOS image sensor is described herein as an example, the present technology can also be applied to a front-illuminated image sensor, a vertical spectroscopic image sensor including an organic photoelectric film, and the like. Further, the present technology can also be applied to an image sensor in which the pixel unit and the peripheral unit are formed in the same chip, a stacked image sensor in which the pixel unit and the peripheral unit are formed in different chips that are stacked on each other, and the like.

In the pixel 42 shown in FIG. 4, an insulating layer and a wiring layer 62 including a metal are disposed on a supporting substrate 61, and a silicon substrate 63 is disposed on the wiring layer 62. Silicon, glass epoxy, glass, plastic, or the like is used as the supporting substrate 61. On the silicon substrate 63, a plurality of photodiodes 64 (optical elements) as the photoelectric converters of the respective pixels is formed at predetermined intervals.

A protective film 65 including an insulator formed on the silicon substrate 63 and the photodiodes 64. On the protective film 65, light blocking films 66 for preventing leakage of light to adjacent pixels are formed between the adjacent photodiodes 64.

A flattening film 67 for flattening the region on which color filters are to be formed is formed on the protective film 65 and the light blocking films 66. A color filter layer 68 is formed on the flattening film 67. In the color filter layer 68, a plurality of color filters is provided for the respective pixels, and the colors of the respective color filters are arranged according to the Bayer array, for example.

A first organic material layer 69 is formed on the color filter layer 68. An acrylic resin material, a styrene resin material, an epoxy resin material, or the like is used as the first organic material layer 69. Microlenses 70 are formed on the first organic material layer 69.

A cover glass 71 is bonded to the upper portions of the microlenses 70 via a second organic material layer 72. The cover glass 71 does not necessarily include glass, but may include a transparent plate including resin or the like. A protective film for protection from moisture and impurities may be formed between the microlenses 70 and the cover glass 71. Like the first organic material layer 69, the second organic material layer 72 is formed with an acrylic resin material, a styrene resin material, an epoxy resin material, or the like.

<Configuration of the Pixel Unit>

Figure 5:
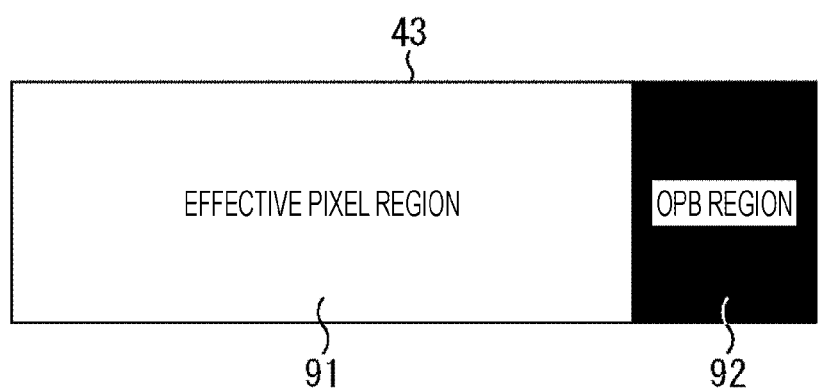
FIG. 5 is a diagram for explaining the configuration of a pixel unit.

FIG. 5 is a diagram showing the configuration of the pixel unit 43. The pixel unit 43 includes an effective pixel region 91 and a light-blocking pixel region (hereinafter referred to as the optical black (OPB) region 92). The effective pixel region 91 occupies most of the pixel unit 43, and is the region in which pixels for detecting actual data to be output as an image signal are arranged. The size thereof is determined in accordance with the angle of view of the image signal to be output.

The OPB region 92 occupies one end of the pixel unit 43, and is the region in which pixels for detecting correction data for correcting the image signal detected in the effective pixel region 91 are arranged. The size thereof can be increased to enhance the accuracy of the correction data.

It should be noted that an example in which the OPB region 92 is provided at one end of the effective pixel region 91 as shown in FIG. 5 is described herein. However, it is also possible to adopt a configuration in which the OPB region 92 is provided at both ends of the effective pixel region 91, or a configuration in which the OPB region 92 is provided both in the longitudinal direction and the lateral direction. Further, the present technology described below can be adopted, regardless of the position and the size of the OPB region 92.

The OPB region 92 is the region formed to obtain a black reference level serving as the reference for determining the luminance level of the pixel signal obtained in the effective pixel region 91. The OPB region 92 is formed with pixels 42 provided in a region shielded from incident light with a light blocking film (such as a light blocking plate including a metal). The signal level obtained from the pixels 42 is adopted as the black reference, and the luminance Level is determined as described above.

Being pixels shielded from light, the pixels 42 in the OPB region 92 are pixels that are not affected by any external factor. Unlike the pixels 42 in the OPB region 92, the pixels 42 in the effective pixel region 91 are pixels that are opened to convert light into an electrical signal in accordance with incident light, have output signals varying depending on the intensity of incident light, and are affected by external factors.

In the example described below as an example of PUF generation, signals from the pixels 42 disposed in the OPB region 92 in the image sensor 31 are used in PUF generation. As described above, the pixels 42 disposed in the OPB region 92 are not influenced by any external factor, and accordingly, a PUF can be generated without being affected by external factors. A PUF is generated by taking advantage of the fact that the output data from each pixel 42 is different due to the variation of defects in the semiconductor in the portion forming the image sensor 31. Since the locations, the sizes, the number, and the like of defects in the semiconductor do not depend on temperature, a PUF generated by utilizing such defects in the semiconductor can also be generated independently of temperature. Furthermore, temporal deterioration hardly occurs, and thus, it is possible to generate a PUF that does not change with time.

Further, a PUF is generated with the use of signals from pixels in the OPB region 92 provided as part of the image sensor 31. Thus, it is possible to generate a PUF by utilizing an existing configuration, without any addition of a new circuit or the like for generating PUFs.

Note that the fact that it is possible to generate a PUF that does not change with temperature variation or the passage of time means that, when the PUF processing device 13 performs determination using a PUF, changes within such a range that the result of the determination is the same are included, for example. In other words, when a PUF (referred to as a first PUF) at a predetermined temperature is compared with a PUF (referred to as a second PUF) at a higher temperature than that, for example, the first PUF and the second PUF are determined to be the same not only in a case where the first PUF and the second PUF are exactly the same but also in a case where the difference between the first PUF and the second PUF is within the margin of error (an acceptable range).

<Functions of the Imaging Device>

Figure 6:
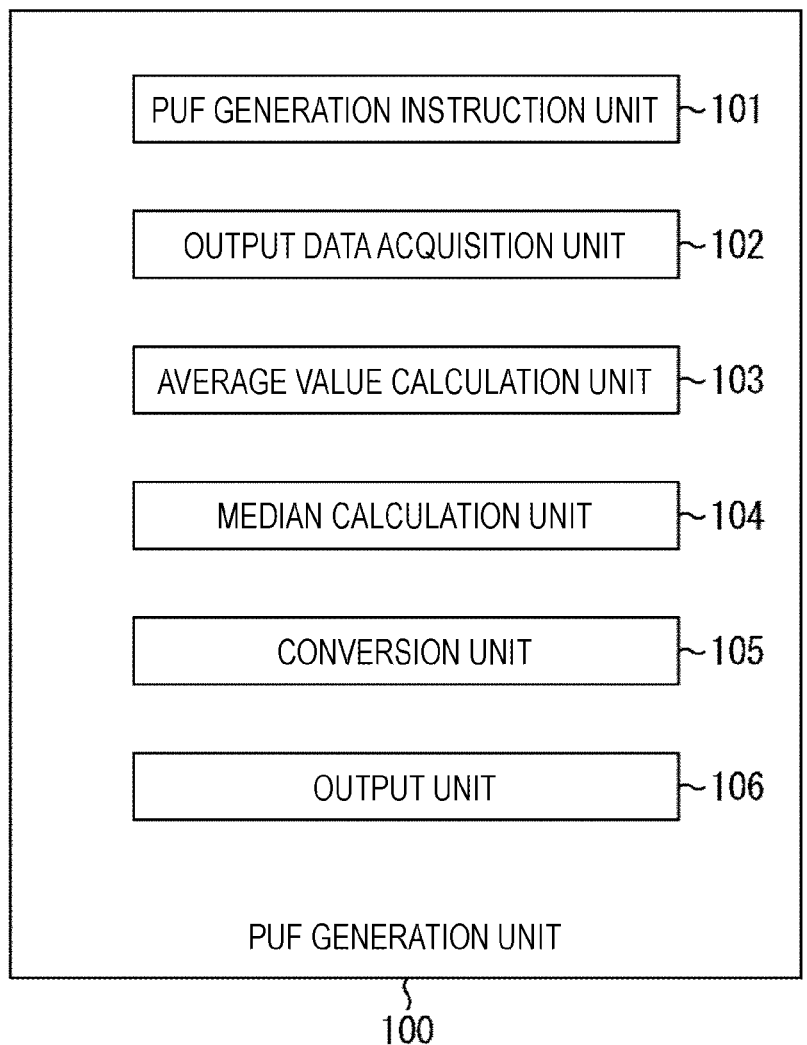
FIG. 6 is a diagram for explaining the configuration of a PUF generation unit.

FIG. 6 is a functional block diagram of the imaging device 11. The imaging device 11 includes a PUF generation unit 100 as a function related to PUF generation, and the PUF generation unit 100 includes a PUF generation instruction unit 101, an output data acquisition unit 102, an average value calculation unit 103, a median calculation unit 104, a conversion unit 105, and an output unit 106.

The PUF generation unit 100 shown in FIG. 6 is a function related to PUF generation in the imaging device 11, and the imaging device 11 of course has other functions such as an imaging function. Also, the description will continue on the assumption that the imaging device 11 has the function related to PUF generation, but an information processing device may be formed with a single unit that is the PUF generation unit 100 having the functions shown in FIG. 6.

Further, the information processing device forming the PUF generation unit 100 may be a semiconductor IC. Alternatively, the PUF generation unit 100 may be a function to be achieved by a computer executing a predetermined program.

The PUF generation instruction unit 101 issues a PUF generation instruction to each function shown in FIG. 6. For example, the PUF generation instruction unit 101 issues a PUF generation instruction at a time when the imaging device 11 is activated, a time when an image is captured, a time when image data is recorded into the recording unit 36 (FIG. 2), a time when an instruction is issued from the PUF processing device 13, or the like.

The output data acquisition unit 102 acquires output data from the pixel 42 in the CPB region 92. The output data acquisition by the output data acquisition unit 102 is performed a plurality of times in one PUF generation operation. The explanation will be continued below on the assumption that it is performed 10 times, for example. Note that as will be described later, in a case where a PUF is generated with output data from the pixels 42 in the effective pixel region 91, the output data acquisition unit 102 acquires output data from the pixels 42 in the effective pixel region 91. As will be described later, it is also possible to acquire output data from a memory or the like, and generate a PUF. In such a case, the output data acquisition unit 102 acquires output data from the memory.

The average value calculation unit 103 calculates the average value of the output data read 10 times from the same pixel 42 in the OPB region 92, for each pixel 42.

The median calculation unit 104 calculates a median from the set of average values calculated by the average value calculation unit 103.

The conversion unit 105 compares the median with the average value of each pixel 42, converts the average values larger than the median to 1, and converts the average values smaller than the median to 0. The explanation will be continued below on the assumption that the average values larger than the median are converted to 1, and the average values smaller than the median are converted to 0. However, the average values larger than the median may be converted to 0, and the average values smaller than the median may be converted to 1. Meanwhile, the same average value as the median may be converted to 1, or may be converted to 0.

The output unit 106 outputs the generated PUF. For example, in a case where the generated PUF is to be incorporated into the image data 12 of a captured image, the generated PUF is output so as to be included in the image data 12 when the image data 12 is output (recorded). Further, in a case where a PUF is generated in accordance with an instruction from the PUF processing device 13, the generated PUF is output to the PUF processing device 13.

<Functions of the PUF Processing Device>

Figure 7:
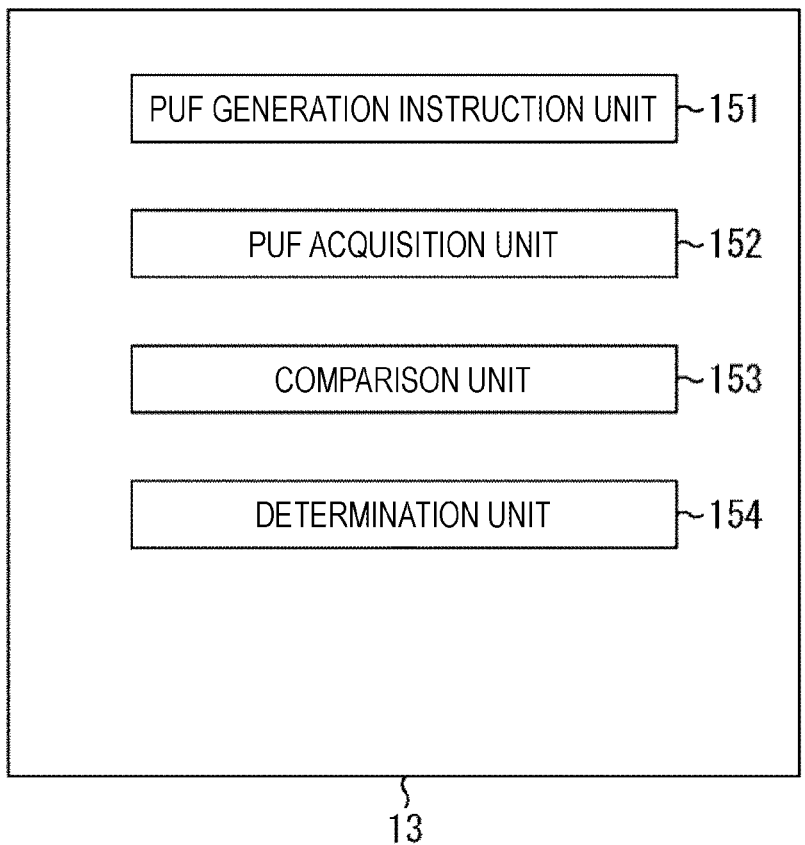
FIG. 7 is a diagram for explaining the configuration of a PUF processing device.

Next, the functions of the PUF processing device 13 are described. FIG. 7 is a functional block diagram of the PUF processing device 13. The PUF processing device 13 includes a PUF generation instruction unit 151, a PUF acquisition unit 152, a comparison unit 153, and a determination unit 154.

The PUF generation instruction unit 151 instructs the imaging device 11 to generate a PUF. In a case where a PUF generation instruction is issued from the PUF generation instruction unit 151 of the PUF processing device 13, the imaging device 11 generates a PUF. In this manner, the imaging device 11 is designed to generate a PUF when instructed, and is not designed to store PUFs. As the imaging device 11 stores no PUFs, it is possible to prevent unauthorized PUF reading from the imaging device 11.

The PUF acquisition unit 152 acquires the PUF 22 (FIG. 1) generated on the side of the imaging device 11, in accordance with an instruction from the PUF generation instruction unit 151. The PUF acquisition unit 152 also acquires the PUF 21 (FIG. 1) included in the image data 12.

The comparison unit 153 compares the PUF 21 and the PUF 22 acquired by the PUF acquisition unit 152 with each other. A result of the comparison is supplied to the determination unit 154.

By referring to the supplied comparison result, the determination unit 154 determines whether the PUF 21 and the PUF 22 are identical, and outputs a determination result to a processing unit in a later stage (not shown), the display unit that is to display the determination result, or the like.

In a case where the PUF 21 and the PUF 22 are determined to be identical as a result of the comparison, the image data 12 including the PUF 21 can be determined to be the image data of an image captured by the imaging device 11 that has supplied the PUF 22. Further, in a case where the PUF 21 and the PUF 22 are determined not to be identical, on the other hand, the image data 12 including the PUF 21 can be determined not to be the image data of an image captured by the imaging device 11 that has supplied the PUF 22.

<First PUF Generation Process>

Figure 8:
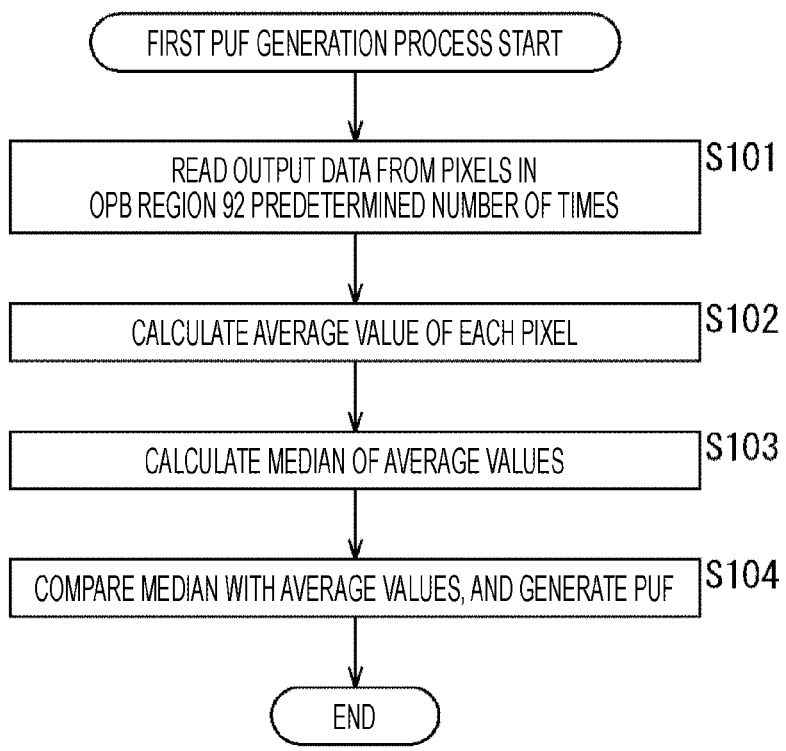
FIG. 8 is a flowchart for explaining a first PUF generation process.

Referring now to the flowchart shown in FIG. 8, a first PUF generation process to be performed by the PUF generation unit 100 shown in FIG. 6 is described.

The process shown in the flowchart in FIG. 8 is started when a PUF generation instruction is issued from the PUF generation instruction unit 101. The PUF generation instruction unit 101 issues a PUF generation instruction at a time as described above.

In step S101, the output data acquisition unit 102 reads output data from each pixel 42 in the OPB region 92 a predetermined number of times. For example, the predetermined number of times is ten. In this case, the output data acquisition unit 102 reads the output data from each pixel 42 in the OPB region 92 ten times.

It should be noted that the current pixels 42 from which output data is to be read may be all the pixels in the OPB region 92 or a predetermined number of pixels in the OPB region 92.

In step S102, the average value calculation unit 103 calculates the average value of the output data acquired from each pixel 42. For example, since the output data is read ten times in this example, the average value of the output data read in the ten reading operations is calculated.

The average value (the average pixel output) is calculated, to eliminate output variation caused by random components. Therefore, output data may be read any number of times as long as it is possible to eliminate output variation caused by random components, and the number of times is not limited to ten as described above. Further, it is also possible to adopt a method by which output variation caused by random components is eliminated by a technique other than average value calculation.

In step S103, the median calculation unit 104 calculates the median from the set of calculated average values of the output data of each pixel 42. For example, in a case where output data is read from 100 pixels 42 in the OPB region 92 and the average values of the output data of the 100 pixels 42 are calculated, the median of the 100 average values is calculated.

It is also possible to calculate the median by calculating the average value of the 100 average values, for example. Alternatively, the average value obtained at the highest frequency among the 100 average values may be set as the median.

In step S104, the conversion unit 105 compares the median with the average value of each pixel 42, to generate a PUF. Specifically, the median is compared with the average values of the respective pixels 42, the average values larger than the median are converted to 1, the average values smaller than the median are converted to 0, and the converted data (data string) is set as a PUF.

In this manner, a PUF is generated. That is, a PUF is generated with signals from pixels 42 (imaging elements) disposed in the OPB region 92 in the image sensor 31. The pixels 42 disposed in the OPB region 92 are not influenced by any external factor, and accordingly, a PUF can be generated without being affected by external factors.

A PUF is generated by taking advantage of the fact that the output data from each pixel 42 is different due to the variation of defects in the semiconductor in the portion forming the image sensor 31. Since the locations, the sizes, the number, and the like of defects in the semiconductor do not depend on temperature, a PUF generated by utilizing such defects in the semiconductor can also be generated independently of temperature. Furthermore, temporal deterioration hardly occurs, and thus, it is possible to generate a PUF that does not change with time.

Further, a PUF is generated with the use of signals from pixels in the OPB region 92 provided as part of the image sensor 31. Thus, it is possible to generate a PUF by, utilizing an existing configuration, without any addition of a new circuit or the like for generating PUFs.

<Second PUF Generation Process>

Figure 9:
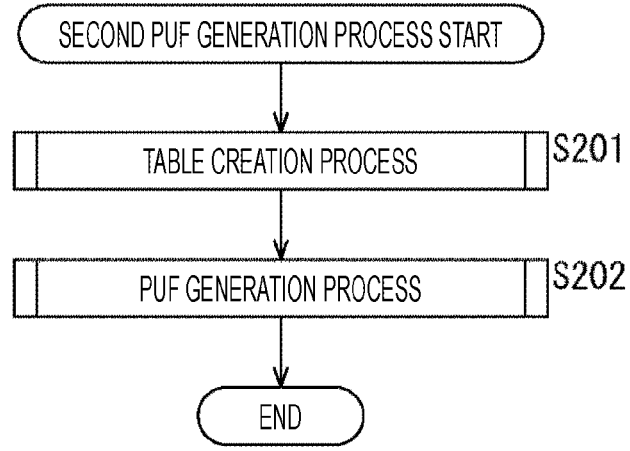
FIG. 9 is a flowchart for explaining a second PUF generation process.
Figure 10:
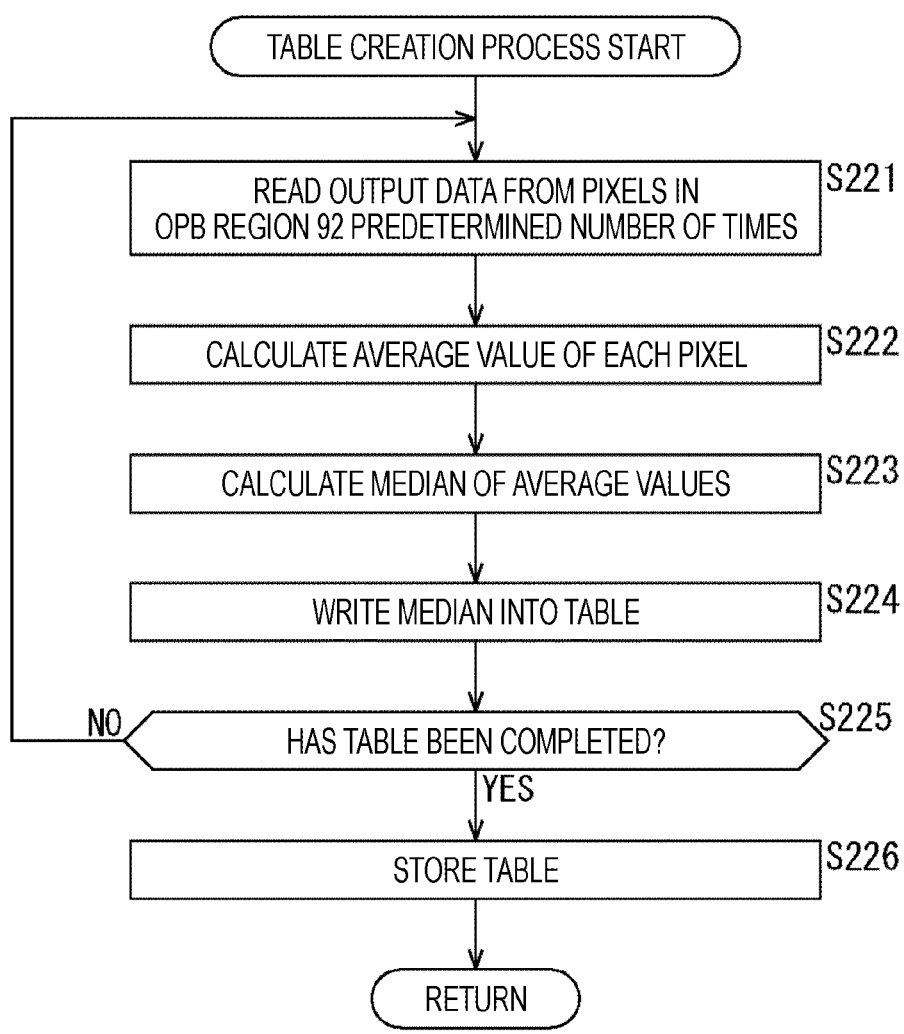
FIG. 10 is a flowchart for explaining a table creation process.
Figure 11:
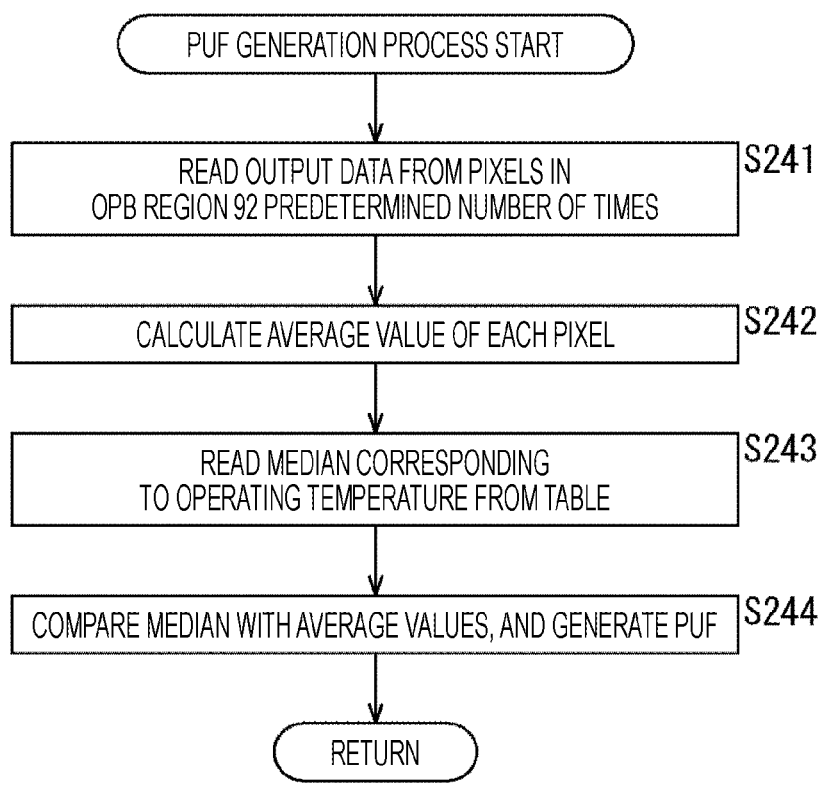
FIG. 11 is a flowchart for explaining a PUF generation process.

Referring next to the flowcharts shown in FIGS. 9 through 11, a second PUF generation process to be performed by the PUF generation unit 100 shown in FIG. 6 is described.

In the second PUF generation processing, a table is created, the table is referred to in generating a PUF. Specifically, in step S201 (FIG. 9), a table creation process is performed. The table created in the process is referred to, and a PUF generation process is performed in step S202.

FIG. 10 is a flowchart for explaining the table creation process to be performed in step S201.

The processes in steps S221 through S223 are processes for calculating the median, and are processes similar to those in steps S101 through S103 (FIG. 8). Therefore, explanation thereof is not made herein. However, the processes in steps S221 through S223 are performed at a predetermined temperature, and a table in which the temperature is associated with the calculated median is created.

That is, in step S224, the median calculated in step S223 is associated with the temperature of the image sensor 31 at that time (the ambient temperature around the image sensor 31 or the temperature of the substrate of the image sensor 31), and is written into the table.

In step S225, a check is made to determine whether the table has been completed. In a case where the medians have been calculated at all the temperatures set as the temperatures to be written in the table, the table is determined to have been completed. For example, in a case where a table that stores medians at every five degrees from 0 degrees to 60 degrees in temperature is to be created, medians are sequentially calculated from 0 degrees, 5 degrees, 10 degrees, . . . to 60 degrees, and are associated with the temperatures in the table.

In such a case, a check is made to determine whether a table in which the medians at 0 to 60 degrees are written has been created, so that the determination process in step S225 is performed.

If it is determined in step S225 that the table has not been completed, the temperature around the image sensor 31 (the temperature of the substrate of the image sensor 31) is changed, and the processes in steps S221 through S224 are repeated at the changed temperature. The median at the changed temperature is calculated and written into the table.

If it is determined in step S225 that the table has been completed, on the other hand, the process moves on to step S226, and the created table is stored into a storage unit (not shown) such as a memory. The storage unit in which the table is stored is provided as one of the functions of the PUF generation unit 100, and can be provided in the imaging device 11 (or in the image sensor 31).

The table creation process shown in FIG. 10 is performed when the image sensor 31 is manufactured (or when the imaging device 11 including the image sensor 31 is manufactured). Also, the table creation process shown in FIG. 10 is performed only once, and is not performed every time the PUF generation process in step S202 (FIG. 9) is performed.

Further, the determination in step S225 is a determination to be made on the manufacturing apparatus side (the manager who manages the manufacturing apparatus) of the PUF generation unit 100 (the image sensor 31 including the PUF generation unit 100).

When a PUF generation instruction is issued to the imaging device 11 storing the table, the PUF generation process is performed in step S202. Referring now to the flowchart shown in FIG. 11, the PUF generation process to be performed in step S202 is described.

As the processes in steps S241 through S244 are performed basically in a manner similar to the first PUF generation process shown in FIG. 8, detailed explanation thereof is not made herein. However, the difference is that a median is read from the table in step S243.

In step S243, the median calculation unit 104 reads a median that has already been calculated and written in the table, from the table. The median to be read is the median associated with the current temperature.

Therefore, the image sensor 31 (the imaging device 11) is equipped with a sensor for measuring the temperature, and the median corresponding to the temperature obtained with the sensor is read from the table.

In this manner, medians are associated with temperatures, and are stored into a table, so that the table can be referred to in generating a PUF.

In the second PUF generation process, a table in which temperatures are associated with medians is stored in the image sensor 31 (the imaging device 11). However, even if the table is read from the image sensor 31 in an unauthorized manner, it is not possible to generate any PUF from the read table.

As described above, a PUF cannot be generated unless there is the average value of the output data of each pixel in the OPB region 92. Therefore, if only the table is acquired in an unauthorized manner, generation of a PUF can be prevented. Accordingly, security or the like using PUFs is not adversely affected. Thus, in a case where PUFs are used for security, and a table in which medians are written is used, it is possible to prevent security from becoming lower.

Also, since the table is a table that stores temperatures and medians in one-to-one correspondence, the storage capacity for storing the table may be small.

In a case where a PUF is generated in this manner, a PUF is also generated with signals from pixels 42 disposed in the OPB region 92 in the image sensor 31. Thus, it is possible to generate a PUF, without being affected by any external factor.

Also, a table in which temperatures are associated with medians is created and stored, and is referred to when a PUF is generated. In this manner, even if a PUF changes with temperature, a PUF that absorbs the change can be generated. Thus, it becomes possible to generate a PUF and perform a determination process using the generated PUF with high accuracy, without being affected by temperature changes.

Temporal deterioration hardly occurs, and thus, it is possible to generate a PUF that does not change with time, as in the above described embodiment. Further, a PUF is generated with the use of signals from pixels in the OPB region 92 provided as part of the image sensor 31. Thus, it is possible to generate a PUF by utilizing an existing configuration, without any addition of a new circuit or the like for generating PUFs.

<Third PUF Generation Process>

Figure 12:
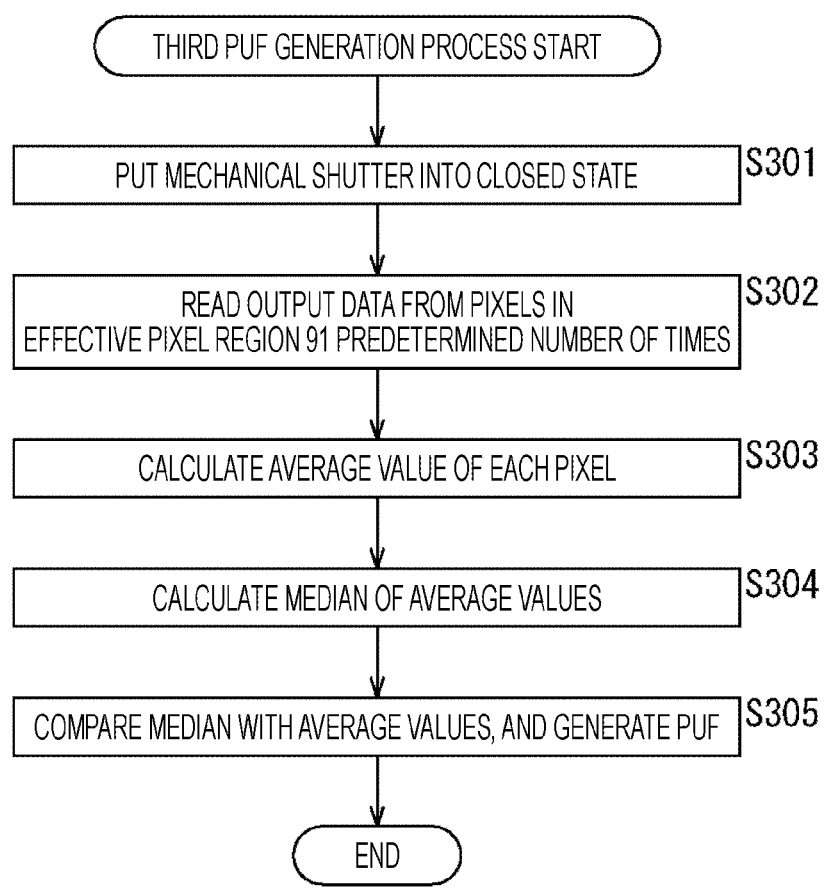
FIG. 12 is a flowchart for explaining a third PUF generation process.

Referring next to the flowchart shown in FIG. 12, a third PUF generation process to be performed by the PUF generation unit 100 shown in FIG. 6 is described.

In the first and second PUF generation processes described above, a PUF is generated with the use of output data from pixels 42 in the OPB region 92. In the third PUF generation process, output data from pixels 42 in the effective pixel region 91 is used in generating a PUF.

As a PUF is generated with the use of output data from pixels 42 in the effective pixel region 91, the third PUF generation process can be adopted both in a case where the pixel unit 43 includes the effective pixel region 91 and the OPB region 92 as shown in FIG. 5, and in a case where the pixel unit 43 includes only the effective pixel region 91.

In a case where the pixel unit 43 includes the effective pixel region 91 and the OPB region 92, pixels 42 in the effective pixel region 91 are used to generate a PUF. Likewise, in a case where the pixel unit 43 includes only the effective pixel region 91, pixels 42 in the effective pixel region 91 are used to generate a PUF.

In step S301, the mechanical shutter is put into a closed state. When issuing a PUF generation instruction, the PUF generation instruction unit 101 checks whether the mechanical shutter is in a closed state. If the mechanical shutter is in an open state, the PUF generation instruction unit 101 instructs a mechanical shutter control unit (not shown) to close the mechanical shutter.

In step S302, with the mechanical shutter in a closed state, output data from pixels 42 in the effective pixel region 91 is read a predetermined number of times. This process is similar to the process of step S101 in FIG. 8, for example. While output data from pixels 42 in the OPB region 92 is read in step S101, output data from pixels 42 in the effective pixel region 91 is read in step S302.

In this manner, with the mechanical shutter in a closed state, output data from pixels 42 in the effective pixel region 91 is read, so that output data from pixels 42 in the effective pixel region 91 can be acquired in a light-blocked state. Also, output data from pixels 42 can be acquired in a state where there is no influence of external factors, as in a case where output data from pixels 42 in the OPB region 92 is read.

The current pixels 42 from which output data is to be read may be all the pixels 42 in the effective pixel region 91 or may be some of the pixels 42 in the effective pixel region 91. Also, the number of times reading is performed is ten, for example, as in the above described embodiment.

In step S303, the average value of the output data of each pixel 42 is calculated. In step S304, the median of the average values is calculated. Then, in step S305, the median is compared with the average values, and a PUF is generated.

The processes in steps S303 through S305 are performed in a manner similar to the processes in steps S102 through S104 shown in FIG. 8, and therefore, detailed explanation thereof is not made herein.

In a case where a PUF is generated in this manner, a PUF is generated with signals that are transmitted from pixels 42 disposed in the effective pixel region 91 in the image sensor 31 and are obtained in a light-blocked state. Thus, it is possible to generate a PUF, without being affected by any external factor.

A PUF is generated by taking advantage of the fact that the output data from each pixel 42 is different due to the variation of defects in the semiconductor in the portion forming the image sensor 31. Since the locations, the sizes, the number, and the like of defects in the semiconductor do not depend on temperature, a PUF generated by utilizing such defects in the semiconductor can also be generated independently of temperature. Furthermore, temporal deterioration hardly occurs, and thus, it is possible to generate a PUF that does not change with time.

Further, a PUF is generated with the use of signals from pixels in the effective pixel region 91 provided as part of the image sensor 31. Thus, it is possible to generate a PUF by utilizing an existing configuration, without any addition of a new pixel or the like for generating PUFs.

It should be noted that the second PUF generation process and the third PUF generation process may be combined. Specifically, pixels 42 in the effective pixel region 91 may be used in creating a table in which medians are associated with temperatures. The table may be referred to in comparing the corresponding median with the average values of the output data from the pixels 42 in the effective pixel region 91, and thus, a PUF may be generated.

Note that in the above described embodiment, a case where a PUF is generated with the use of pixels 42 in the effective pixel region 91 or the OPB region 92 in the pixel unit 43 has been described as an example. However, dedicated pixels for generating PUFs may be provided so that a PUF can be generated in the above described manner.

<Determination Process to be Performed by the PUF Processing Device>

Figure 13:
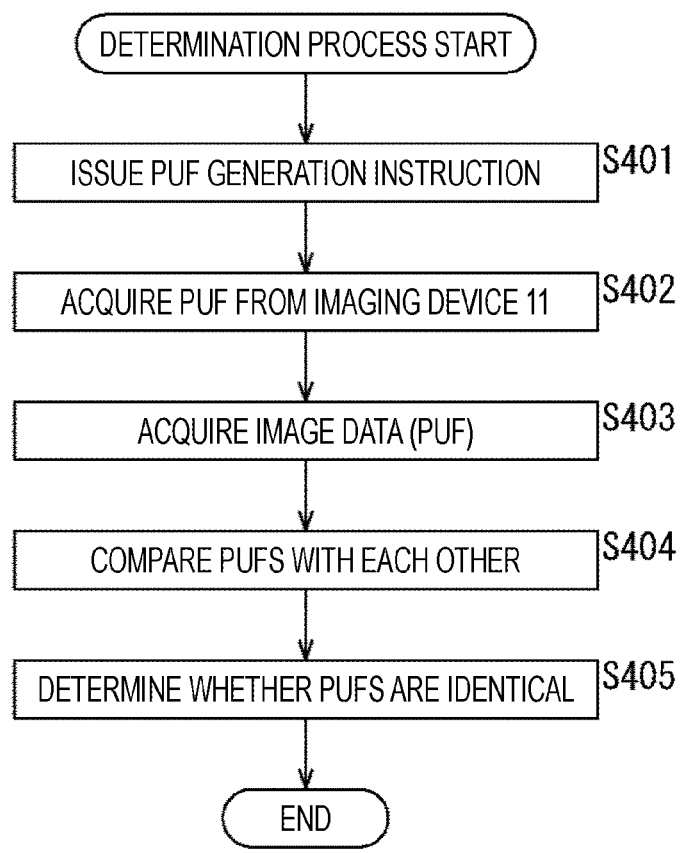
FIG. 13 is a flowchart for explaining a determination process.

Referring next to the flowchart shown in FIG. 13, a determination process to be performed by the PUF processing device 13 making a determination using a PUF generated in one of the first through third PUF generation processes is described.

In step S401, the PUF generation instruction unit 151 issues a PUF generation instruction to the imaging device 11 (or the PUF generation unit 100 in the imaging device 11). Upon receiving the PUF generation instruction, the PUF generation unit 100 performs one of the above described first through third PUF generation processes, to generate a PUF.

In step S402, the PUF acquisition unit 152 acquires the PUF 22 (FIG. 1) generated on the side of the imaging device 11. The issuance of the instruction to the imaging device 11 in step S401 and the acquisition of the PUF in step S402 are performed via a network or short-distance wireless communication such as NFC.

In step S403, the PUF acquisition unit 152 also acquires the PUF 21 (FIG. 1) included in the image data 12.

In step S404, the comparison unit 153 compares the acquired PUF 21 with the PUF 22, and supplies a comparison result to the determination unit 154. The comparison is performed by calculating a Hamming distance. A Hamming distance is the number of different characters located in corresponding positions in two character strings formed with the same number of characters. For example, the Hamming distance between "1011101" and "1001001" is "2".

A PUF can be regarded as a character string formed with 0s and 1s, and the PUF 21 is compared with the PUF 22, to calculate the Hamming distance.

In step S405, the determination unit 154 refers to the result of the comparison made by the comparison unit 153, or the Hamming distance in this case, and determines whether the PUF 21 and the PUF 22 are identical. For example, in a case where the Hamming distance is 30% or less of the total population parameter, the determination unit 154 determines that the PUF 21 and the PUF 22 are identical. In a case where the Hamming distance is 30% or more of the total population parameter, the determination unit 154 determines that the PUF 21 and the PUF 22 are not identical.

For example, in a case where the PUF 21 and the PUF 22 are determined to be identical, it is possible to determine that the image data 12 was captured by the imaging device 11. In a case where the PUF 21 and the PUF 22 are determined not to be identical, it is possible to determine that the image data 12 was captured by an imaging device 11 other than the imaging device 11.

Taking advantage of this fact, a check can be made to determine whether an image published on the Internet, for example, is an image captured by the imaging device 11, or is published with authorization, for example. In a case where an image is published without authorization, some kinds of measure can be taken.

PUF generation is performed with the image sensor 31 (an imaging element) in the above described example, and the imaging device 11 has been described as an example of a device that includes the image sensor 31. The imaging device 11 may be a camera that captures a still image, or may be a camera that captures a moving image. The present technology described above can also be applied to a scanner or the like that includes the image sensor 31.

Further, although an example case where the image sensor 31 has the functions of the PUF generation unit 100 has been described, a semiconductor IC may have the functions of the PUF generation unit 100.

In the above embodiment, a PUF is generated with the use of output data from pixels in the OPB region 92 or pixels in the effective pixel region 91 shielded from light. In other words, a PUF is generated with the use of output data output from the image sensor 31 (pixels) when the image sensor 31 is not receiving light.

In view of this, the present technology can also be applied to a memory element such as a memory. In a situation where data is not stored or is stored in a memory (a memory element), and any signal is not being supplied to the memory, signals from the memory are read, and a PUF can be generated with the signals.

Example Application to a Memory

Figure 14:
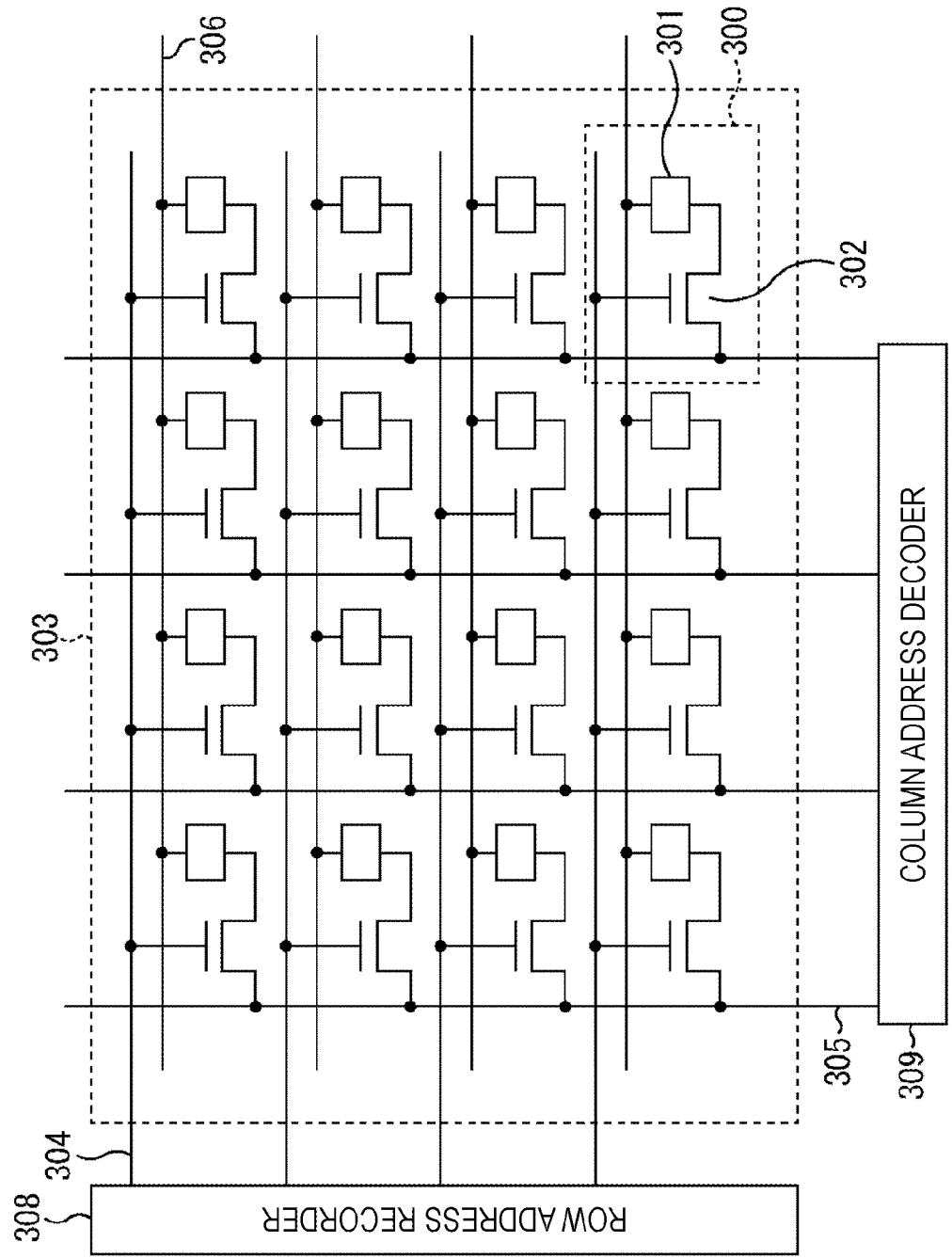
FIG. 14 is a diagram showing the configuration of a memory.

FIG. 14 shows an example configuration of a memory. A memory cell 300 is formed with a memory element 301 and an access transistor 302, and a memory cell array 303 in which memory cells 300 are arranged in a plurality of rows and a plurality of columns is formed. A word line 304, a bit line 305, a first power supply line 306, and a second power supply line 307 are connected to each memory cell 300.

A row address decoder 308 is connected to each word line 304, and a column address decoder 309 is connected to each bit line 305. Through the row address decoder 308 and the column address decoder 309, the current memory cell 300 to be subjected to writing, erasing, or reading is selected from the memory cell array 303. A sense amplifier (not shown) is also connected to each bit line 305, and data read from the selected memory cell 300 is detected by the sense amplifier.

Writing of data into this memory is performed by applying a predetermined voltage to the selected memory cell 300. Specifically, the column to which the current memory cell 300 to be subjected to writing in the memory cell array 303 is connected is selected, a voltage for data writing is applied to the corresponding bit line 305, and a voltage is applied to the other bit lines so that data writing will not be performed even if the voltage for data writing is applied to any of the corresponding memory cells.

At the same time, a row to which the current memory cell 300 to be subjected to writing is connected is selected, and a control voltage is applied to the corresponding word line 304 so that the access transistor 302 of the memory cell 300 is turned on to enable data writing to the memory cell 300. Meanwhile, a voltage for controlling the access transistors 302 is applied to the other word lines so that data writing is not performed on the memory cells connected to the other word lines. As a result, it becomes possible to perform data writing by applying a desired data write voltage only to the selected memory cell 300, while preventing unexpected data writing from being performed on the unselected memory cells.

Figure 15:
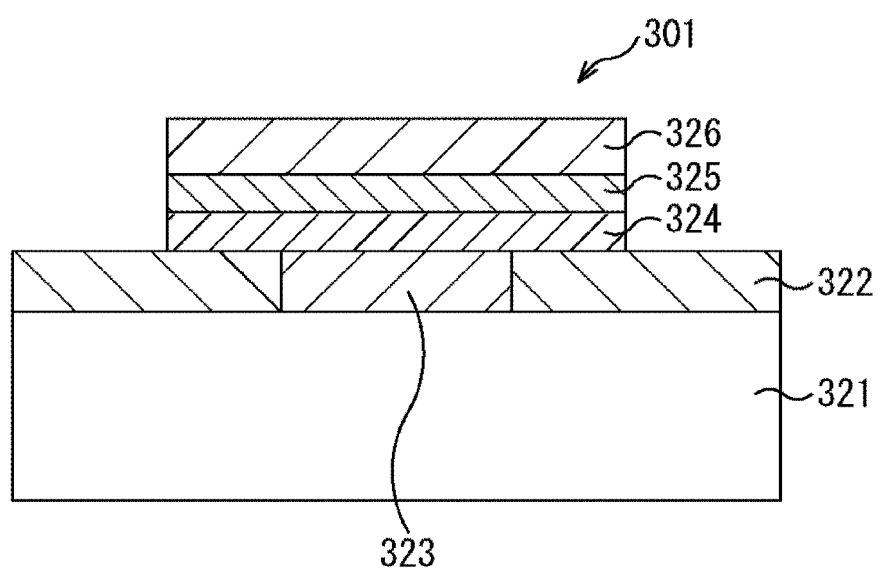
FIG. 15 is a diagram for explaining the structure of a memory element.

FIG. 15 is a diagram showing the structure of the memory element 301 of a memory cell 300. The memory element 301 has a high-resistance layer 324 and an ion source layer 325 between a lower electrode 323 and an upper electrode 326. The lower electrode 323 is provided on a silicon substrate 321 in which a complementary metal oxide semiconductor (CMOS) circuit is formed, for example, and can be the portion connecting to the CMOS circuit portion.

The memory element 301 is formed by stacking the lower electrode 323, the high-resistance layer 324, the ion source layer 325, and the upper electrode 326 in this order on the silicon substrate 321. The lower electrode 323 is buried in an opening of an insulating layer 322 formed on the silicon substrate 321. The high-resistance layer 324, the ion source layer 325, and the upper electrode 326 are formed in the same plane pattern. The lower electrode 323 is narrower than the high-resistance layer 324 and is electrically connected to part of the high-resistance layer 324.

In a case where writing is performed on the memory cell 300 having such a configuration, a positive potential (+ potential) is applied to the upper electrode 326, and a negative potential (− potential) or zero potential is applied to the lower electrode 323. When a predetermined potential is applied to the upper electrode 326 and the lower electrode 323, at least one kind of metal element among Cu, Ag, and Zn is ionized from the ion source layer 325, and diffuses in the high-resistance layer 324, to bind with electrons and precipitate on the side of the lower electrode 323, or remain diffused inside the high-resistance layer 324.

As a result, a current path containing a large amount of at least one kind of metal element among Cu, Ag, and Zn is formed in the high-resistance layer 324, or a large number of defects due to at least one kind of metal element among Cu, Ag, and Zn are formed in the high-resistance layer 324. Therefore, the resistance value of the high-resistance layer 324 becomes lower. The resistance value of the ion source layer 325 is originally lower than the resistance value of the high-resistance layer 324 before recording. Therefore, as the resistance value of the high-resistance layer 324 becomes lower at this stage, the resistance value of the entire memory element 301 also becomes lower. The resistance of the entire memory element 301 at this stage becomes the write resistance.

After that, the potential to be applied to the upper electrode 326 and the lower electrode 323 is made zero, so that the low-resistance state of the memory element 301 is maintained. In this manner, information is written.

In a case where erasing is performed, a negative potential (− potential) is applied to the upper electrode 326, and a positive potential (+ potential) or zero potential is applied to the lower electrode 323. When a predetermined potential is applied to the upper electrode 326 and the lower electrode 323, at least one kind of metal element among Cu, Ag, and Zn, which constitute the current path or an impurity level formed in the high-resistance layer 324 is ionized, to move inside the high-resistance layer 324 and return to the side of the ion source layer 325.

As a result, the current path or defects disappear from the inside of the high-resistance layer 324, and the resistance value of the high-resistance layer 324 becomes higher. The resistance value of the ion source layer 325 is originally lower. Therefore, as the resistance value of the high-resistance layer 324 becomes higher at this stage, the resistance value of the entire memory element 301 also becomes lower. The resistance of the entire memory element 301 at this stage becomes the erase resistance.

After that, the potential to applied to the upper electrode 326 and the lower electrode 323 is made zero, so that the high-resistance state of the memory element 301 is maintained. Recorded information is erased in this manner. As such a process is repeatedly performed, it is possible to repeatedly perform information recording (writing) and recorded information erasing on the memory element 301.

In the memory having such a configuration, the above described PUF generation processes can be performed. In an element using the silicon substrate 321 or the like, such as the memory element 301 shown in FIG. 15, or the pixel 42 shown in FIG. 4, signals due to solid variation are generated even in a state where no voltage is applied or in a state where no light is received. A PUF can be generated with the use of the signals due to solid variation.

In the above described memory, for example, after writing or erasing has been performed on the current memory elements 301 (all or some of the memory elements) to be subjected to processing, or after the current memory elements 301 to be subjected to processing are set under the same condition in either a storing state or a non-storing state, the signals output from the current memory elements 301 to be subjected to processing are read.

Such reading is equivalent to the reading from pixels 42 in the OPB region 92, and is performed a plurality of times. The average value of the signals read from each memory element 301 is then calculated, the median is calculated from the set of the average values of the respective memory elements 301, and the median is compared with the average values, to generate a PUF. That is, it is possible to generate a PUF through a process similar to that in a case where a PUF is generated with the image sensor 31.

In a case where a PUF is generated with a memory, the PUF generated with the memory can be incorporated into various kinds of data such as text data, image data, and audio data, for example.

For example, a PUF generated by a predetermined personal computer is incorporated into text data generated by the predetermined personal computer. Then, when the text data including the PUF is reproduced, the text cannot be reproduced, unless the PUF included in the text data matches a PUF generated by the personal computer. In this manner, text data cannot be reproduced by any computer other than a particular personal computer, and thus, it becomes possible to prevent unauthorized use of text data.

The present technology can be applied not only the above described memory, but also to a variable resistance memory, a spin memory, or the like, for example.

As a PUF is generated with the use of signals generated due to individual variation among elements such as memory elements or imaging elements, the present technology can also be applied to elements with individual variation, other than memory elements and imaging elements.

Usage Examples of the Imaging Device

Figure 16:
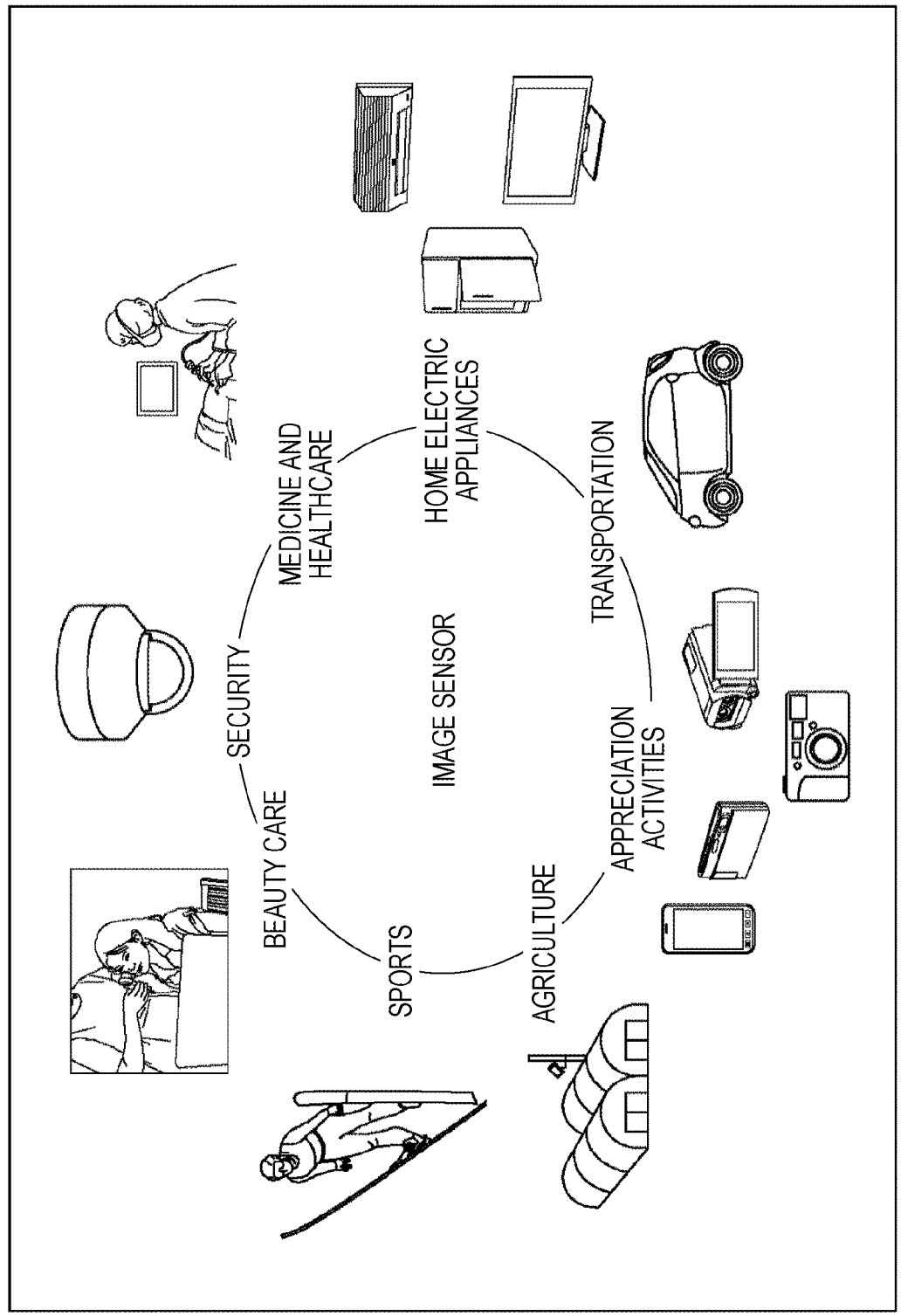
FIG. 16 is a view for explaining usage examples of the image sensor.

FIG. 16 is a diagram showing usage examples of the image sensor 31.

The above described image sensor 31 can be used in various cases where light such as visible light, infrared light, ultraviolet light, an X-ray, or the like is sensed, as described below. That is, as shown in FIG. 16, the image sensor 31 can be used in an apparatus that is used not only in the appreciation activity field where images are taken and are used in appreciation activities, but also in the field of transportation, the field of home electric appliances, the fields of medicine and healthcare, the field of security, the field of beauty care, the field of sports, the field of agriculture, or the like, for example.

Specifically, in the appreciation activity field, the image sensor 31 can be used in an apparatus for taking images to be used in appreciation activities, such as a digital camera, a smartphone, a mobile telephone with a camera function, or the like, as described above.

In the field of transportation, the image sensor 31 can be used in apparatuses for transportation use, such as vehicle-mounted sensors configured to take images of the front, the back, the surroundings, the inside, and the like of an automobile to, for example, perform safe driving like an automatic stop and recognize a driver's condition, surveillance cameras for monitoring running vehicles and roads, and ranging sensors and the like for measuring distances between vehicles and the like.

In the field of home electric appliances, the image sensor 31 can be used in an apparatus to be used as home electric appliance, such as a television set, a refrigerator, an air conditioner, or the like to take images of gestures of users and operate the apparatus in accordance with the gestures. Also, in the fields of medicine and healthcare, the image sensor 31 can be used in an apparatus for medical use or healthcare use, such as an endoscope, an apparatus for receiving infrared light for angiography, or the like.

In the field of security, the image sensor 31 can be employed in apparatuses for security use, such as surveillance cameras for crime prevention, cameras for personal authentication, and the like. Also, in the field of beauty care, the image sensor 31 can be used in an apparatus for beauty care use, such as a skin measurement apparatus configured to image the skin, a microscope for imaging the scalp, or the like.

In the field of sports, the image sensor 31 can be employed in apparatuses for sporting use, such as action cameras and wearable cameras for sports and the like, for example. Also, in the field of agriculture, the image sensor 31 can be employed in apparatuses for agricultural use, such as cameras and the like for monitoring conditions of fields and crops.

It should be noted that embodiments of the present technology are not limited to the above described embodiments, and various modifications may be made to them without departing from the scope of the present technology. For example, it is possible to employ a combination of all or some of the above described plurality of embodiments.

The present technology may also be embodied in the configurations described below.

(1)

An information processing device including:

a reading unit that reads output data from a predetermined element a plurality of times;

an average value calculation unit that calculates an average value of the output data read by the reading unit;

a median calculation unit that calculates a median of the average value calculated by the average value calculation unit; and a PUF generation unit that generates a physical unclonable function (PUF) by comparing the median with the average value.

(2)

The information processing device according to (1), in which the predetermined element is an image sensor, and the reading unit reads the output data from the image sensor when the image sensor is shielded from light.

(3)

The information processing device according to (1) or (2), in which the predetermined element is an image sensor in an optical black (OPB) region.

(4)

The information processing device according to (1) or (2), in which the predetermined element is an image sensor, and the reading unit reads the output data from the image sensor when a mechanical shutter is in a closed state.

(5)

The information processing device according to (1), in which the predetermined element is a memory element.

(6)

The information processing device according to any of (1) to (5), in which the PUP generation unit generates the PUF by converting the average value to a first value in a case where the average value is larger than the median, and converting the average value to a second value in a case where the average value is smaller than the median.

(7)

The information processing device according to any of (1) to (6), in which a table in which temperature is associated with the median is stored, and the PUF generation unit generates the PUF by reading the median associated with a measured temperature from the table, and comparing the median with the average value.

(8)

The information processing device according to any of (1) to (7), which is a semiconductor IC.

(9)

The information processing device according to any of (1) to (8), which generates the PUF, when there is an instruction from another device.

(10)

The information processing device according to (1), in which the predetermined element is an image sensor, and the PUF generated by the PUF generation unit is included in data of an image captured by the image sensor.

(11)

An information processing method including the steps of:

reading output data from a predetermined element a plurality of times;

calculating an average value of the read output data;

calculating a median of the calculated average value; and generating a physical unclonable function (PUF) comparing the median with the average value.

(12)

A program for causing a computer to perform a process including the steps of:

reading output data from a predetermined element a plurality of times;

calculating an average value of the read output data;

calculating a median of the calculated average value; and generating a physical unclonable function (PUF) by comparing the median with the average value.

REFERENCE SIGNS LIST

11 Imaging device
12 Image data
13 PUF processing device
21, 22 PUF
31 Image sensor
91 Effective pixel region
92 OPB region
100 PUF generation unit
101 PUF generation instruction unit
102 Output data acquisition unit
103 Average value calculation unit
104 Median calculation unit
105 Conversion unit
106 Output unit
151 PUF generation instruction unit
152 PUF acquisition unit
153 Comparison unit
154 Determination unit

What is claimed is:

1. An information processing device, comprising:
   a reading unit that reads output data from a predetermined element a plurality of times;
   an average value calculation unit that calculates an average value of the output data read by the reading unit;
   a median calculation unit that calculates a median of the average value calculated by the average value calculation unit; and
   a PUF generation unit that generates a physical unclonable function (PUF) by comparing the median with the average value,
   wherein the predetermined element is an image sensor, and
   wherein the reading unit reads the output data from the image sensor when the image sensor is shielded from light.

2. The information processing device according to claim 1, wherein the PUF generation unit generates the PUF by converting the average value to a first value in a case where the average value is larger than the median, and converting the average value to a second value in a case where the average value is smaller than the median.

3. The information processing device according to claim 1, wherein
   a table in which temperature is associated with the median is stored, and
   the PUF generation unit generates the PUF by reading the median associated with a measured temperature from the table, and comparing the median with the average value.

4. The information processing device according to claim 1, wherein the information processing device is a semiconductor IC.

5. The information processing device according to claim 1, wherein the information processing device generates the PUF when there is an instruction from another device.

6. The information processing device according to claim 1, wherein the predetermined element is an image sensor in an optical black (OPB) region.

7. The information processing device according to claim 1, wherein the reading unit reads the output data from the image sensor when a mechanical shutter is in a closed state.

8. An information processing device, comprising:
   a reading unit that reads output data from a predetermined element a plurality of times;
   an average value calculation unit that calculates an average value of the output data read by the reading unit;
   a median calculation unit that calculates a median of the average value calculated by the average value calculation unit; and
   a PUF generation unit that generates a physical unclonable function (PUF) by comparing the median with the average value,
   wherein the predetermined element is an image sensor in an optical black (OPB) region.

9. The information processing device according to claim 8, wherein the reading unit reads the output data from the image sensor when the image sensor is shielded from light.

10. The information processing device according to claim 8, wherein the PUF generation unit generates the PUF by converting the average value to a first value in a case where the average value is larger than the median, and converting the average value to a second value in a case where the average value is smaller than the median.

11. The information processing device according to claim 8, wherein
a table in which temperature is associated with the median is stored, and
the PUF generation unit generates the PUF by reading the median associated with a measured temperature from the table, and comparing the median with the average value.

12. The information processing device according to claim 8, wherein the information processing device is a semiconductor IC.

13. The information processing device according to claim 8, wherein the information processing device generates the PUF when there is an instruction from another device.

14. An information processing device, comprising:
a reading unit that reads output data from a predetermined element a plurality of times;
an average value calculation unit that calculates an average value of the output data read by the reading unit;
a median calculation unit that calculates a median of the average value calculated by the average value calculation unit; and
a PUF generation unit that generates a physical unclonable function (PUF) by comparing the median with the average value,
wherein the predetermined element is an image sensor, and
wherein the reading unit reads the output data from the image sensor when a mechanical shutter is in a closed state.

15. The information processing device according to claim 14, wherein the PUF generation unit generates the PUF by converting the average value to a first value in a case where the average value is larger than the median, and converting the average value to a second value in a case where the average value is smaller than the median.

16. The information processing device according to claim 14, wherein
a table in which temperature is associated with the median is stored, and
the PUF generation unit generates the PUF by reading the median associated with a measured temperature from the table, and comparing the median with the average value.

17. The information processing device according to claim 14, wherein the information processing device is a semiconductor IC.

18. The information processing device according to claim 14, wherein the information processing device generates the PUF when there is an instruction from another device.

19. The information processing device according to claim 14, wherein the reading unit reads the output data from the image sensor when the image sensor is shielded from light.

20. An information processing device, comprising:
a reading unit that reads output data from a predetermined element a plurality of times;
an average value calculation unit that calculates an average value of the output data read by the reading unit;
a median calculation unit that calculates a median of the average value calculated by the average value calculation unit; and
a PUF generation unit that generates a physical unclonable function (PUF) by comparing the median with the average value,
wherein the predetermined element is an image sensor, and
wherein the PUF generated by the PUF generation unit is included in data of an image captured by the image sensor.

* * * * *